United States Patent [19]

Rickman, Jr.

[11] Patent Number: 5,081,711
[45] Date of Patent: Jan. 14, 1992

[54] COMPUTER PERIPHERAL DEVICE CONTROL AND COMMUNICATION SYSTEM

[76] Inventor: James D. Rickman, Jr., P.O. Box 272, 31 Olde Farms Rd., Boxford, Mass. 01921

[21] Appl. No.: 284,741

[22] Filed: Nov. 8, 1988

Related U.S. Application Data

[63] Continuation of Ser. No. 18,448, Feb. 24, 1987, abandoned.

[51] Int. Cl.⁵ .............................................. H04B 10/00
[52] U.S. Cl. .................................... 359/146; 360/32; 359/154; 359/184
[58] Field of Search ............ 455/603, 617, 608; 340/710, 712; 377/15; 360/32

[56] References Cited

U.S. PATENT DOCUMENTS

| | | | |
|---|---|---|---|
| 3,590,250 | 6/1971 | Witkover | 455/603 |
| 3,757,037 | 9/1973 | Bialek | 340/712 |
| 3,866,177 | 2/1975 | Kawamata et al. | 455/603 |
| 3,906,366 | 9/1975 | Minami et al. | 455/603 |
| 4,036,762 | 7/1977 | Troetscher et al. | 455/603 |
| 4,413,290 | 11/1983 | Furuta | 360/69 |
| 4,475,153 | 10/1984 | Kihara et al. | 358/335 |
| 4,578,674 | 3/1986 | Baker et al. | 455/603 |
| 4,596,049 | 6/1986 | Rizzotti, III | 340/825.72 |
| 4,688,756 | 9/1989 | Crane et al. | 379/88 |
| 4,720,853 | 1/1988 | Szlam | 379/373 |
| 4,788,715 | 11/1988 | Lee | 379/88 |
| 4,833,663 | 5/1989 | Satoh | 360/32 |
| 4,912,524 | 3/1990 | Nakamura | 455/608 |

*Primary Examiner*—Joseph A. Orsino
*Assistant Examiner*—L. Van Beek
*Attorney, Agent, or Firm*—Stephen G. Matzuk

[57] ABSTRACT

A system for communication between a computer and peripheral devices. The computer is made to generate long duration, synchronous, bi-phase binary coded electrical signals that can be shaped and amplified and then used to modulate a high frequency infrared light beam. Video and audio tape motion counts or electrical signal frequency counts can be read by the computer through the mouse port. Two pulse trains that change relative phase with a change in tape motion direction can be used to record motion counts and determine the direction of motion.

13 Claims, 3 Drawing Sheets

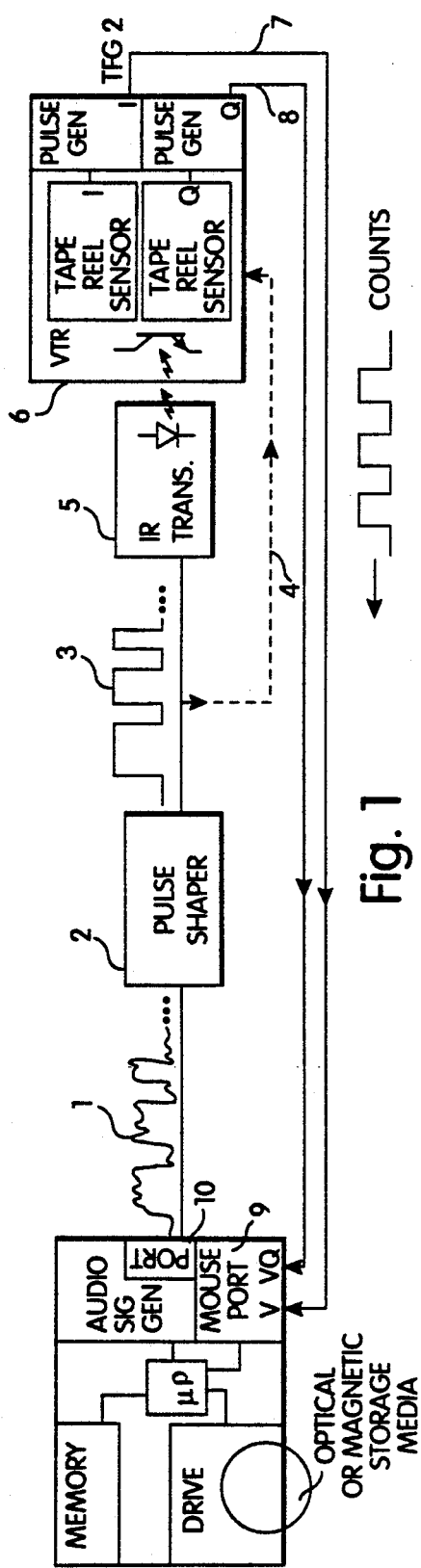
Fig. 1
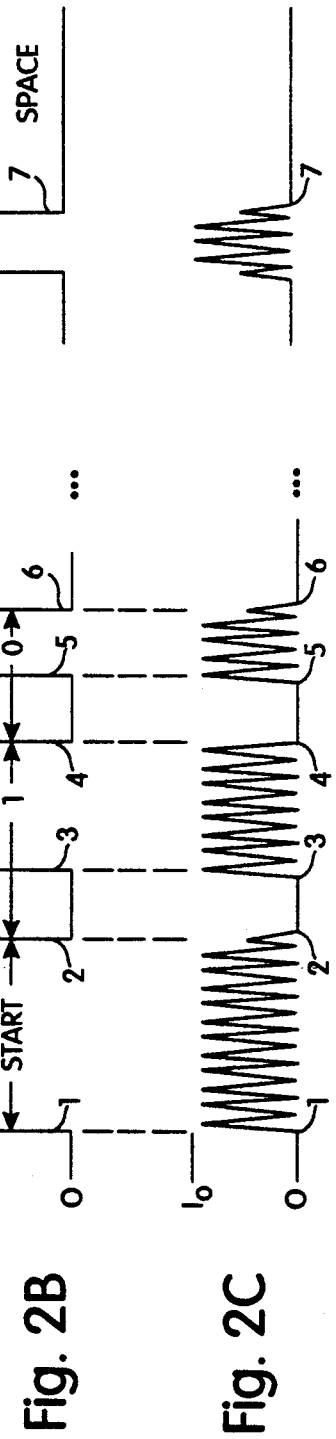
Fig. 2A
Fig. 2B
Fig. 2C

COMPUTER PERIPHERAL DEVICE CONTROL AND COMMUNICATION SYSTEM

BACKGROUND OF THE INVENTION

This application is a continuation in part of U.S. Ser. No. 018448, now abandoned.

REFERENCES CITED

U.S. Pat. Nos.

4,536,806 8/1985 Louth
4,449,198 5/1984 Kroon
4,422,105 12/1983 Rodesch
4,475,153 10/1984 Kihara
4,078,236 3/1978 Hempell
4,413,290 11/1983 Kuruta
4,498,158 2/1985 Akiyama

Other Publications

Ciarcia, S., Build an Infrared Remote Controller, Byte, February 1987, vol. 12, pp. 101–110.

The present invention relates to the communication between a computer and peripheral devices under its control.

One well known standard of communication between computers and external devices is called the "RS-232" standard as defined by the Institute for Electrical and Electronic Engineers (IEEE). The standard is usually implemented on computers by a combination of hardware and software that constrains communication to words of seven or eight binary digits (bits) framed by start and stop bits. The words are transmitted asynchronously one at a time without a precise timing relationship between words. Bits are represented by single-phase voltage levels by holding the voltage high or low for the entire time allowed for transmission of the data bit.

Other well-known communication ports and software drivers found on computers, including parallel Centronics and IEEE-488 interfaces, keyboard interfaces and disk drive interfaces, also constrain communication signals to single-phase, asynchronous, eight-bit word transmissions.

These standard computer communications ports are suitable for communication with printers, modems, keyboards and other computers, but do not provide the bi-phase, synchronous, variable bit length infrared (IR) transmissions often required for communication with consumer electronic devices. Video decks, televisions, compact disk players, laser disk players, tape players and radios are often controlled by a high-frequency infrared beam modulated with a bi-phase, digital, synchronous code. Code bit lengths and timing vary from one manufacturer to another.

The Sony consumer device protocol currently requires up to ten synchronous repetitions of forty-five millisecond frames consisting of twelve bi-phase data bits. Binary data logic level signals amplitude modulate a 40 khz sinusoidal signal to produce bursts of high frequency IR radiation. The IR signal is decoded by the controlled device to recover the binary data transmitted. This signal cannot be sent through standard computer communications ports described above because the time duration of the signal is too long to be transmitted without interruption, and the signal is bi-phase, greater than eight bits in length and requires a high frequency infrared carrier beam.

An object of the present invention is to provide computers with a bi-phase, variable bit length, synchronous, infrared communications system port and associated computer software to communicate with a variety of peripheral devices. This system can also be used to provide synchronous or asynchronous serial communication by direct connection to devices or communication lines.

Video and audio decks contain indexing circuitry and software to display current tape location in counts or seconds from the start of the tape. Electrical pulses from a track on the tape or the tape motion mechanism are counted by deck control circuits and used to calculate current tape position and speed.

It is an object of the present invention to provide a means for the computer to count these device pulses. This is done by connecting device electrical pulse sources to the "mouse" port of a computer under the control of system and application software. The mouse port acts as a computer electrical signal pulse count input port. In some peripheral devices such as 8 mm video decks, two device pulse trains must be read to determine both tape position and direction of motion. The pulse trains shift in relative phase with a change in the direction of motion. The mouse port is ideal for this purpose because it consists of hardware and system software designed to read two pulse trains from the mouse motion mechanism and determine its direction of motion from the relative phase of two pulse trains.

SUMMARY OF THE INVENTION

The objects of the invention are met by communicating through the audio ports and system software drivers present on many personal computers currently in use. In order to produce intelligible and esthetically pleasing computer-generated speech and music, computer sound generation circuitry and software provide for long duration, uninterrupted transmission of audio electrical signals. This is often done with custom integrated circuit chips that produce sound synchronously, independent of the main computer system microprocessors or by dedication of the system microprocessor to sound generation using direct memory access (DMA) to sound wave amplitudes stored in memory. The computer operating system software and sound port software drivers are written to allow for long-duration, synchronous sound signals to be sent through the sound port without interruption by other software or hardware circuitry operating in the computer.

In accordance with the object of this invention, computer software is written to generate sound signals with the shape and timing required to communicate over a synchronous serial channel with variable bit length, bi-phase protocol. The noisy sound signal is shaped and smoothed by pulse-shaping circuitry and the low audio voltage level is amplified to produce a bi-phase, digital logic level synchronous signal. The resulting digital communications signal can be applied directly to a communication line or peripheral device or used to modulate a high-frequency infrared (IR) carrier signal. The peripheral device decodes the IR or direct signal and responds accordingly.

A further object of the invention is to provide communication from the peripheral device or communication line to the computer. One method of doing this is to provide IR decoding circuitry in the computer and an IR transmitter on the peripheral device. A second more restrictive method makes use of the "mouse" or "game"

ports found on many computers to act as an electrical signal pulse count input port. The mouse software and hardware are designed to efficiently count pulses corresponding to movement of the mouse device. This same computer circuitry and software can be used to count electrical pulses taken from peripheral devices corresponding to, for example, video or audio tape motion.

Furthermore, mouse port hardware and software is designed to count two pulse trains from the mouse that have a definite phase relationship that depends on the direction of motion of the mouse. This mouse software and hardware configuration can be used to determine video or audio tape speed, location on the tape and the direction of motion of the tape from pulses fed to the mouse port from appropriate points in the video or audio deck.

The application software used to calculate tape position and speed can make use of standard operating system mouse control software and hardware designed to efficiently record the number of counts from two signal sources and determine the direction of motion from the relative phase of the signals.

BRIEF DESCRIPTION OF THE DRAWINGS

FIG. 1 is a block diagram showing computer generation of an audio electrical signal that is shaped, amplified and used to modulate an infrared communication signal. Video tape counter pulses are returned to the computer mouse port.

FIG. 2 shows sketches of the communication signal as it progresses from
  a) the computer audio port to b) the pulse shaper output to c) the infrared transmitter light intensity output.

THE PREFERRED EMBODIMENTS

Figure 3:
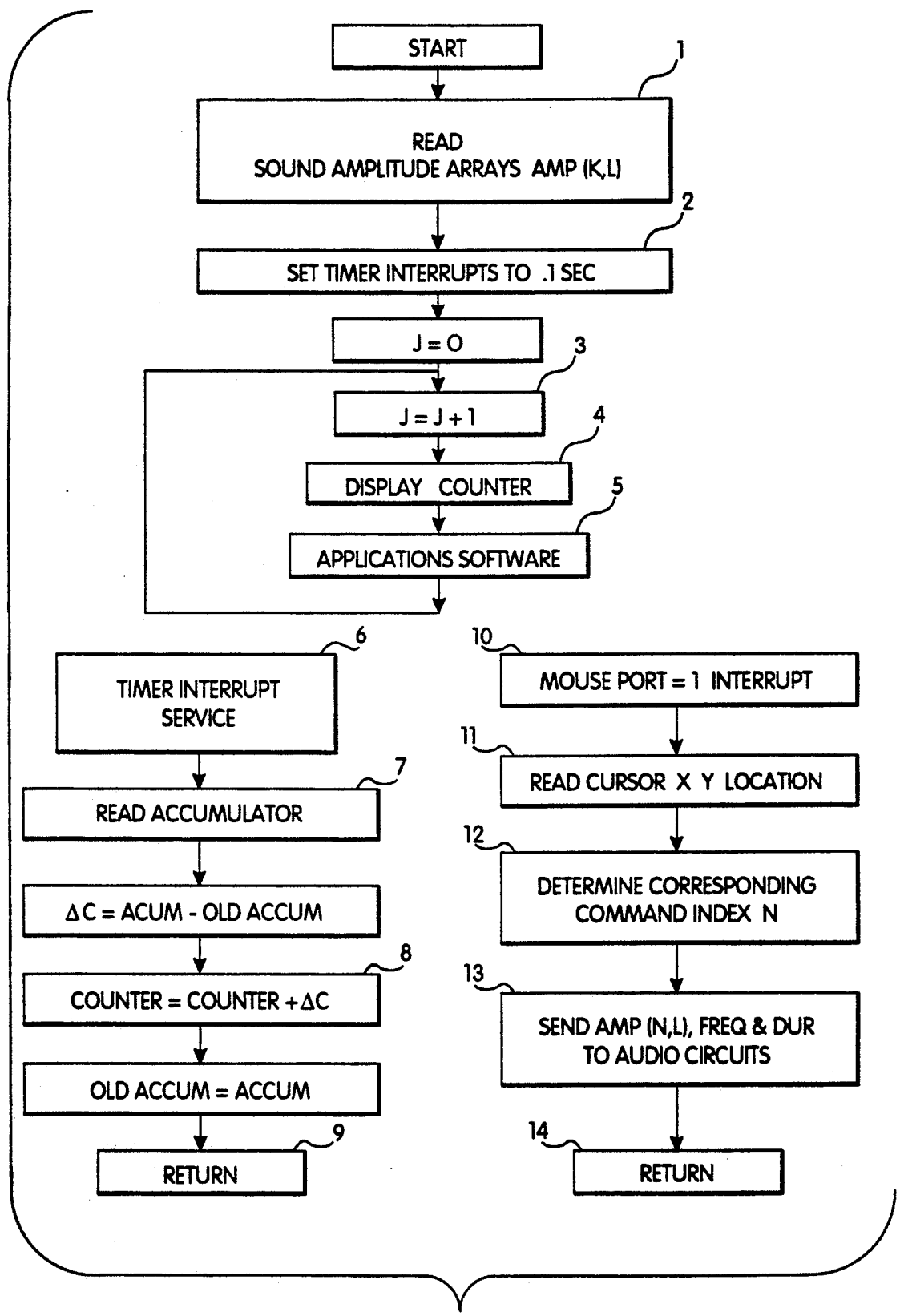
FIG. 3 is a block diagram of the computer software execution sequence required to create communication signal output from the computer audio port and read counter pulses from the mouse port.

The invention will be described in detail with reference to the accompanying drawings.

FIG. 1 illustrates the generation of audio electrical signals by the computer with the shape and timing approximating the twelve-bit, bi-phase digital code required to communicate with Sony consumer electronic devices. Electrical signals 1 from computer audio port 10 are fed into pulse shaping and amplifying circuitry 2 which produces rectangular wave, bi-phase binary code 3. The coded signal can be sent directly to the serial input port of a device or to a communication line as shown by dotted line connection 4 or used to modulate an infrared (IR) carrier signal in infrared transmitter 5. Infrared transmitter 5 sends an amplitude modulated infrared light beam to the IR receiver and decoding circuitry in peripheral device 6 which responds appropriately to the binary data communicated.

Counter pulses from device 6 taken from a tape control track or rotating mechanical part associated with tape motion are counted by computer mouse port 9 hardware and software. The mouse port acts as an electrical signal pulse count input port. A second pulse train that changes its phase relative to the first pulse train with a change in the direction of tape motion may be required to determine the direction of motion.

For example, pulse signals TFG2 and TFG1 taken from tape reel motion indicators in the Sony EVS 700 U 8 mm video tape recorder (VTR) and fed over wires 7 and 8 into the mouse port 9 vertical (V) and vertical quadrature (VQ) pins of the Commodore-Amiga 1000 computer are easily read by system software and mouse port hardware to record the number of tape motion counts and the direction of motion. Application software need only read the number of tape counts and numerical sign from memory locations set aside and kept current by system software and mouse hardware to determine the number of counts and direction of motion. The number of counts recorded during a fixed period of time can be used to calculate the number of counts per second corresponding to tape speed or signal frequency. Numerical calculations may be required to convert from tape counts to playing time from the beginning of the tape.

FIG. 2 shows the communication signal as it progresses through components of the present invention. Sketch 2A shows the low voltage 10 mv amplitude audio electrical signal 1 as it emerges from the computer audio port. The audio signal is usually a noisy, low amplitude representation of the rectangular digital logic level signals desired. This is because computer sound generation circuitry and software is usually designed to produce sinusoidal, cyclic audible sound and has difficulty producing rectangular waves. The sharp edges on the digital code signal, such as 2 in FIG. 2B, correspond to very high frequency signal components of the Fourier spectrum. These high frequency components are often filtered out by sound circuitry that must keep its output below the Nyquist frequency of the computer audio production hardware and software, and operate within the frequency range of the human ear.

FIG. 2B shows a sketch of the amplified bi-phase binary code with precise timing and shape as it emerges from the pulse shaping circuitry. A Sony bi-phase protocol is shown. In this code a binary "1" is represented by a rectangular pulse consisting of a low voltage for 0.6 msec followed by a high of 1.2 msec duration. A "0" is represented by a rectangular pulse consisting of a 0.6 msec low followed by a 0.6 msec high. A complete frame of data contains a device address and instruction for a total of 12 bits and is 45 msec long. The pulse shaping circuitry in the particular embodiment uses a comparator to determine the transition point between high and low voltage logic levels. The low amplitude audio signal 1 in FIG. 2A passes from a negative to positive voltage at location 2. When this happens, the comparator and pulse shaping circuitry output undergoes a transition to the logic level high voltage signal shown in FIG. 2B between points 1 and 2. Point 3 in FIG. 2A and point 2 in FIG. 2B mark the transition of the audio signal to a negative voltage and the shaper logic signal to zero volts. The audio signal becomes positive again at point 4 in FIG. 2A and the comparator and pulse shaping circuitry switch the logic voltage to a positive five volts at the same time at point 3 in FIG. 2B. By a careful choice of audio signal amplitudes and timing in the computer application software, any desired bi-phase synchronous pulse train can be produced. To produce an infrared coded signal the logic level signals shown in FIG. 2B are used to amplitude modulate a high frequency infrared beam giving the signal bursts shown in FIG. 2C. During the logic voltage high between 1 and 2 in FIG. 2B, a burst of high frequency IR radiation is transmitted between points 1 and 2 in FIG. 2C. The digital code low voltage between 2 and 3 in FIG. 2B results in no IR light output as shown between points 2 and 3 in FIG. 2C. A high can be made to correspond to no IR signal by inverting the digital code before modulating the IR carrier beam. It can be seen by comparing FIGS. 2A, 2B and 2C that the noisy computer audio port electrical signal is converted by the present invention into precisely timed bursts of infrared radiation that communicate coded information to the peripheral device.

A block diagram of the computer instructions required to generate infrared commands to control an 8 mm video deck are shown in FIG. 3. The software is designed to issue commands corresponding to icon symbols on the computer screen. The deck commands are selected by clicking the first mouse port mouse button when its cursor is positioned over the icon corresponding to the deck command to be transmitted.

The software begins execution in block 1 by reading device parameters and arrays of sound amplitudes required to give the signal shapes required for each deck command. The K index of the amplitude array AMP(K,L) identifies the command to be transmitted and the L index identifies an element of a set of 256 amplitude values for each command. The parameters and amplitude arrays are stored in a nonvolatile memory such as a magnetic disk or read only memory (ROM).

Each device command is represented by an array of sound amplitudes. In the Commodore-Amiga Computer BASIC software the sound arrays contain 256 points. The amplitude values range from a maximum of 127 to a minimum of −127 and correspond to maximum and minimum values of the audio electrical signal produced by the sound generating circuitry. A signal-frequency of 20 Hz is chosen and the points are evenly spaced over the duration of the signal so that the command signal is represented by 256 amplitude values spaced 0.2 msec apart. Transmission of a binary "0" is accomplished by setting four array elements to −127 to give a low voltage for 0.6 msec followed by three elements set to +127 for a 0.6 msec high voltage period. A binary "1" is transmitted by setting four array elements to −127 followed by six set to 127. The entire amplitude array representing all the bits to be transmitted is sent to the sound generating software and hardware together with frequency and duration information. This causes a sound signal to be generated at the computer audio output port that has the shape and timing of the command binary code.

Pulses from a video or audio deck fed into the second mouse port interrupt program execution and cause a branch to block 7 where the counter is incremented or decremented depending on the relative phase of two pulse trains taken from deck tape motion sensors. The counter value is displayed on the computer screen in block 3 when execution returns to the main program.

The counter value is continuously read and displayed in blocks 2 through 5 until an interrupt is generated. The computer operator may interrupt by clicking a mouse connected to mouse port #1. This interrupt causes execution to begin at block 10 where the mouse cursor location is read in block 11 and the corresponding deck command index is determined in block 12. The appropriate array of amplitudes is sent to the sound generating software and hardware in block 13 to issue the command corresponding to the screen icon selected with the mouse.

Computer system software usually supplied with the computer by the manufacturer converts the amplitude arrays into the appropriate detailed instructions required to operate the computer sound generating hardware. The system software is written to allow uninterrupted continuous sound generation. This makes sending the synchronous, long duration signals required to control most infrared consumer electronics devices possible. System software and hardware is also usually supplied to respond to mouse port interrupts by recording the number of pulses on a mouse port input line and determine the direction of motion from the relative phase of a second input line. Application software written to control external devices through the sound and mouse ports need only send appropriate amplitude arrays to system audio port software and read system software mouse port memory locations containing the number of pulses recorded since last read, and the numerical sign of the number.

Figure 4:
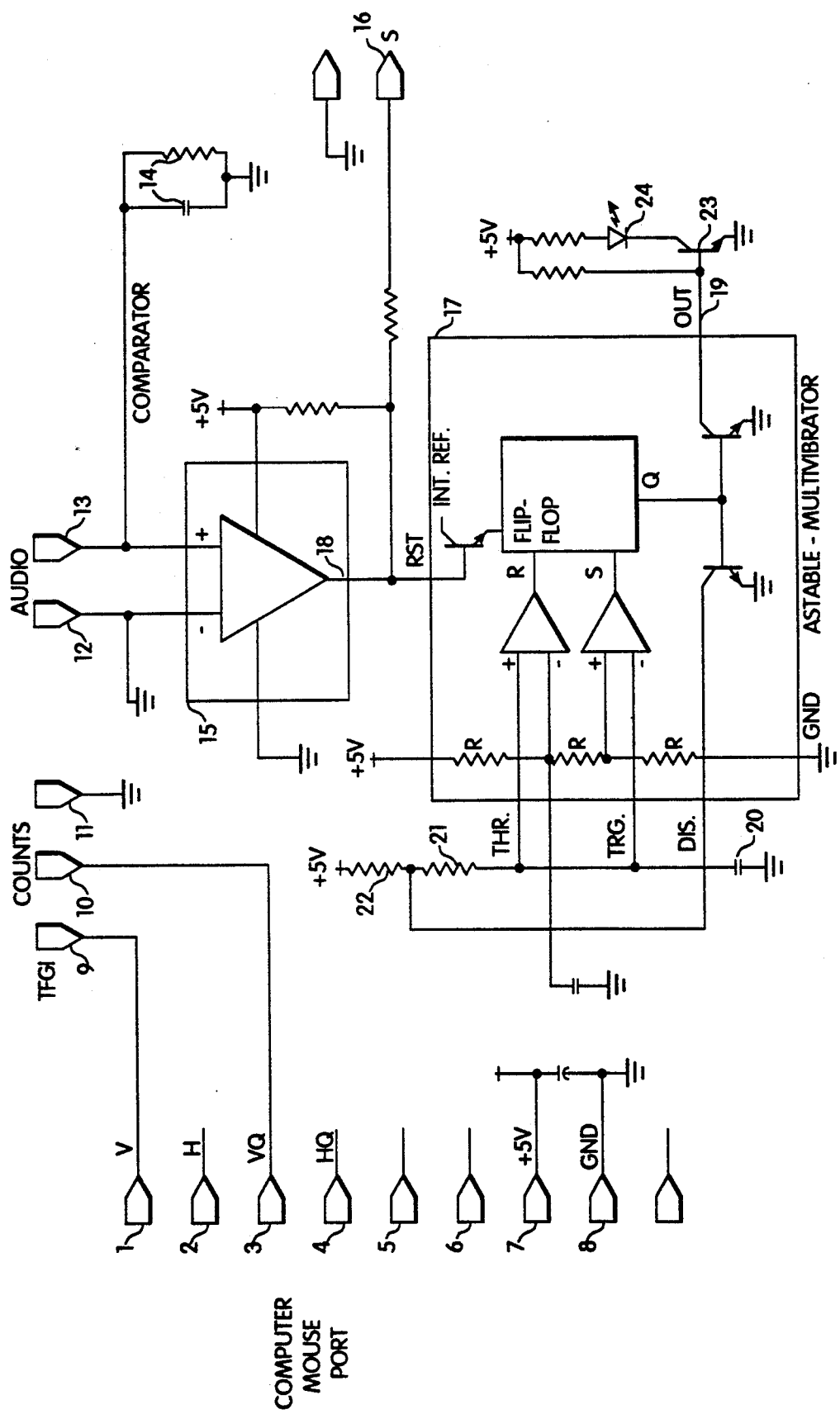
FIG. 4 is a schematic diagram of an audio-to-infrared signal transducer that combines the functions of the pulse shaper and infrared transmitter.

FIG. 4 is a schematic diagram of the pulse shaping and infrared signal generating circuitry used to transform audio electrical signals to digital logic level and infrared light signals. The audio level signal from the computer is input at 13. Resistor 14 reduces the no-input-signal noise level. The audio signal is passed to the positive input of comparator 15. The negative input of the comparator is connected to the audio input signal ground 12. The audio signal ground 12 is also connected to the digital logic ground 8. For array amplitudes above zero, the audio input signal voltage rises above the grounded negative comparator input and the comparator output 18 goes high to the supply voltage level, 5 volts. When the array amplitudes are less than zero and the audio input falls below the negative input ground voltage level, the comparator output 18 drops to zero voltage (ground).

The comparator circuit transforms the low level (usually millivolt level) audio input signal 13 by amplifying and shaping it to produce a logic level voltage (5 V) rectangular pulse signal at the comparator output 18. The comparator output can be connected directly to a device communication port through connector 16 or used to modulate astable-multivibrator 17 generating pulses 19 that drive infrared light emitting diode (LED) 24 by switching transistor 23.

Astable-multivibrator 17 generates rectangular wave pulses at a frequency given by $$f = \frac{1.44}{(R_{22} + 2R_{21})C_{20}} \qquad 1)$$

where f is the frequency of oscillation in Hertz, $R_{22}$ and $R_{21}$ are the resistance values of resistors 22 and 21 of FIG. 4 in ohms and $C_{20}$ − is the capacitance of capacitor 20 in farads. Typical values of $R_{22}=1.5$ k$\Omega$, $R_{21}=17$ k$\Omega$ and $C_{20}=0.001$ mf give a frequency of oscillation of approximately 40 kHz. The rectangular pulse train output 19 of the multivibrator switches transistor 23 to cause diode 24 to alternately emitt and not emitt a beam of infrared light at the pulse train frequency.

The output of the comparator 18 is connected to the reset (RST) input of multivibrator 17 so that when the comparator output is low, the output 19 of the multivibrator is held low and transistor 23 and diode 24 do not conducet.

A bi-phase, binary coded audio input singal 13 at the comparator input acts to amplitude modulate the high frequency astable-multivibrator output 19 producing bursts of high frequency infrared radiation from diode 24 when the audio input is greater than zero volts and no radiation when the audio input is less than zero. Infrared receiving and decoding circuitry in the peripheral device recovers data bits present at comparator output 18 and responds appropriately to the command or data transmitted by the computer.

Astable-multivibrator 17 operates by alternately charging and discharging timing capacitor 20. The capacitor is discharged to ground through resistor 21 and the internal discharge transistor. During discharge the output Q of the FLIP-FLOP is high and the comparator output 19 is held low. When the timing capacitor voltage falls below ⅓ of the supply voltage (5 V), the FLIP-FLOP is reset through the internal comparator connected to the trigger (TRG.) input. This causes the FLIP-FLOP output Q to go low and switches off the discharge and output transistors. Capacitor 20 begins charging through resistors 21 and 22 and comparator output 19 is pulled high. When the timing capacitor 20 voltage rises above ⅔ of the supply voltage, the FLIP-FLOP is set through the internal comparator connected to the threshold (THR.) pin. This starts the discharge process and the cycle repeats itself. The multivibrator output switches continuously from high to low at a rate governed by equation 1.

Computer mouse port #2 is connected to the circuit throught the connector shown at the left of FIG. 4. Tape motion counts enter through connector pins 9 and 10 and are passed to the mouse port through pins 1 and 3. A second set of tape count pulses can be read by the computer through pins 2 and 4. The circuit is powered by the computer through mouse port pin 7 and the circuit ground is connected to the computer logic signal ground through pin 8.

Special computer operating system software can be written to allow for very long duration, uninterrupted or very high interrupt priority transmissions by computer microprocessors or Pheripheral Interface Adaptor (PIA) chips currently used to control communication through conventional serial and parallel ports. For the Sony protocal, synchronous transmission for 90 msec is required to control a device. This can be accomplished by raising and lowering a single bit output line in response to high priority timer interrupts.

Application software can be written to toggle a single-bit data line from a PIA chip or microprocessor to send device commands with the required code and timing, provided computer operating system software either protects the application software from interruption or gives the application software a very high interrupt priority. In this case the desired device command code can be taken from a serial or parallel device port and connected directly to the peripheral device or transformed into an infrared transmission using the circuit shown in FIG. 4. The output of PIA chips and microprocessors is at logic level voltage levels and does not require shaping or amplification, so comparator 15 in FIG. 4 can be eliminated. The computer output can be connected directly to the positive input of astable-multivibrator 17 or connected directly to the peripheral device if infrared control is not required.

Logic level input lines in the PIA or microprocessor can also be used to record tape motion or signal frequency counts if uninterrupted or high priority counting is allowed by operating system software. In this case the PIA chip or microprocessor replaces the mouse port as the computer electrical signal pulse count input port.

The communication system can be extended to provide two or more communication channels by using additional independent audio outputs from the computer as inputs to interface circuits identical to that shown in FIG. 4. Tone decoding circuitry can also be used to allow interface circuits to respond only to predetermined audio input frequencies thus allowing the use of multiple communications channels from a single computer audio output port.

A FLIP-FLOP data latch can be interposed between the comparator output 18 in FIG. 4 and a peripheral device control line to provide a toggle switch. The FLIP-FLOP switches its output from high to low or low to high when an audio pulse is sent from the computer. Two audio signals can be required to toggle the switch by connecting the output of one interface circuit comparator to a D-FLIP-FLOP data line and the other to the FLIP-FLOP clock input.

In another extension of the preferred embodiment, low level audio signal pulses not generated by the computer but taken from another source such as the audio track of an audio or video tape can be read by the mouse port circuitry and used to determine tape position. The signal is passed through the pulse shaping comparator circuitry 15 shown in FIG. 4. The output 18 can then be connected to mouse port input pins and the logic level read with mouse port hardware and software. Signal frequency can be determined from the number of counts per mouse count recording time interval.

Although specific embodiments of this invention have been described herein above with reference to the accompanying drawings, it is to be understood that this invention is not limited to those precise embodiments, and that various changes and modifications may be effected therein by one skilled in the art without departing from the scope or spirit of the invention as defined in the appended claims.

The embodiments of the invention in which an exclusive property or privilege is claimed are defined as follows:

1. A system for generating infrared command modulated logic level electrical signals from a computer, said infrared command modulated logic level electrical signals having synchronous digital command codes for modulating high frequency infrared light for controlling devices that respond to infrared commands, said computer having a memory for storing instructions and data, microprocessor means for automatically executing instructions stored in said memory, and audio signal generating means for generating synchronous audio electrical signals with amplitude, phase and timing controlled by instructions from said microprocessor means; comprising:

infrared command computer program instructions for instructing said microprocessor means to instruct said audio signal generating means to generate synchronous, digitally encoded audio electrical signals with the same timing, phase and shape as said infrared command modulated logic level electrical signals;

amplifying and shaping means for transforming said digitally encoded audio electrical signals into said infrared command modulated logic level electrical signals.

2. System according to claim 1, further including infrared light transducer means for generating and transmitting pulses of high frequency infrared light modulated by said infrared command modulated logic level electrical signals.

3. System according to claim 1, wherein said amplifying and shaping means includes comparator means connected to said audio signal generating means, system to further include infrared light transducer means for generating and transmitting pulses of high frequency infrared light modulated by said infrared command modulated logic level electrical signals, wherein said infrared light transducer means includes astable-multivibrator means connected to said comparator means.

4. A system for monitoring tape deck tape position from a computer, said tape deck having a rotating tape reel for storage and transport of magnetic or optical tape, and tape reel sensor means for generating, with each revolution of said tape reel, an in-phase electrical pulse, and a quadrature pulse ninety degrees out of phase with said in-phase pulse, said computer having a memory for storing instructions and data, microprocessor means for automatically executing instructions stored in said memory, and mouse port means for counting electrical pulses, each count corresponding to the sensing of an in-phase pulse and a quadrature pulse ninety degrees out of phase with said in-phase pulse, said mouse port means having counter means incremented for said in-phase pulse leading said quadrature pulse by ninety degrees and decremented for said quadrature pulse leading said in-phase pulse by ninety degrees; comprising:

of said tape deck; for connecting the in-phase and quadrature pulse sensing means of said mouse port means to the in-phase and quadrature pulse generating means of said tape reel sensor means of said tape deck;

tape counter computer program instructions for instructing said microprocessor means to instruct said mouse port means to count said in-phase and quadrature tape reel sensor pulses from said tape deck.

5. A system for controlling a tape deck from a computer, said tape deck comprising infrared control means for controlling said tape deck with infrared light signals, a rotating shape tape reel for storage and transport of magnetic or optical tape, and tape reel sensor means for generating, with each revolution of said tape reel, and in-phase electrical pulse, and a quadrature pulse ninety degrees out of phase with said in-phase pulse, said computer having a memory for storing instructions and data, microprocessor means for automatically executing instructions stored in said memory, audio signal generating means for generating synchronous audio electrical signals with amplitude, phase and timing controlled by instuctions from said microprocessor means, and mouse port means for counting electrical pulses, each count corresponding to the sensing of an in-phase pulse and a quadrature pulse ninety degrees out of phase with said in-phase pulse, said mouse port means having counter means incremented for said in-phase pulse leading said quadrature pulse by ninety degrees and decremented for said quadrature pulse leading said in-phase pulse by ninety degrees; comprising:

tape deck command computer program instructions for instructing said microprocessor means to instruct said audio signal generating means to generate synchronous, digitally encoded audio electrical signals with the same timing, phase and shape as tape deck command modulated logic level electrical signals having digital codes for modulating high frequency infrared light for controlling said tape deck;

amplifying and shaping means for transforming said digitally encoded audio electrical signals into said tape deck command modulate logic level electrical signals;

of said tape deck for connecting the in-phase and quadrature pulse sensing means of said mouse port means to the in-phase and quadrature pulse generating means of said tape reel sensor means of said tape deck;

tape counter computer program instructions for instructing said microprocessor means to instruct said mouse port means to count said in-phase and quadrature tape reel sensor pulses from said tape deck.

6. System according to claim 5, further including infrared light transducer means for generating and transmitting pulses of high frequency infrared light modulated by said tape deck command modulated logic level electrical signals.

7. System according to claim 5, wherein said amplifying and shaping means includes comparator means, system to further include infrared light transducer means for generating and transmitting pulses of high frequency infrared light modulated by said tape deck command modulated logic level electrical signals, wherein said infrared light transducer means includes astable-multivibrator means.

8. A system for generating synchronous digitally encoded logic level electrical signals from a personal computer, said personal computer having a magnetic or optical storage medium drive for reading data and instructions from a magnetic or optical storage medium, a memory for storing instructions and data read from said optical or magnetic storage medium, microprocessor means for automatically executing instructions stored in said memory and audio electrical signal generating means for producing synchronous sounds with amplitude, phase and timing controlled by said microprocessor means; comprising:

computer program instructions for instructing said microprocessor means to control said audio signal generating means to generate synchronous digitally encoded audio electrical signals;

amplifying and shaping means for transforming said digitally encoded audio electrical signals into said digitally encoded logic level electrical signals.

9. System according to claim 8, wherein said amplifying and shaping means includes comparator means.

10. System according to claim 8, further including infrared light transducer means for generating and transmitting pulses of high frequency infrared light modulated by said synchronous digitally encoded logic level electrical signals.

11. A system for generating synchronous digitally encoded logic level electrical signals from a personal computer, said personal computer having a magnetic or optical storage medium drive for reading data and instructions from a magnetic or optical storage medium, a memory for storing instructions and data read from said optical or magnetic storage medium, microprocessor means for automatically executing instructions stored in said memory and audio electrical signals generating means for producing synchronous sounds with amplitude, phase and timing controlled by said microprocessor; comprising:

computer program instructions for instructing said microprocessor means to control said audio signal generating means to generate synchronous digitally encoded audio electrical signals; and amplifying and shaping means for transforming said digitally encoded audio electrical signals into said digitally encoded logic level electrical signals, wherein said amplifying and shaping means includes comparator means connected to said audio signal generating means, system to further include infrared light transducer means for generating and transmitting pulses of high frequency infrared light modulated by said infrared command modulated logic level electrical signals, and wherein said infrared light transducer means includes astable-multivibrator means connected to said comparator means.

12. A system for controlling video and audio tape decks, laser and compact disk players, televisions and other devices controlled by coded infrared signals from a personal computer, said personal computer having a magnetic or optical storage medium drive for reading data and instructions from a magnetic or optical storage medium, a memory for storing instructions and data read from said optical or magnetic storage medium, microprocessor means for automatically executing instructions stored in said memory and audio electrical signal generating means for producing synchronous sounds with amplitude, phase and timing controlled by said microprocessor means; comprising:

computer program instructions for instructing said microprocessor means to control said audio signal generating means to generate synchronous digitally encoded audio electrical signals with the same timing, phase and shape as infrared command modulated logic level electrical signals for modulating high frequency infrared light for controlling devices that respond to infrared commands;

amplifying and shaping means for transforming said digitally encoded audio electrical signals into said infrared command modulated logic level electrical signals;

infrared light transducer means for generating and transmitting pulses of high frequency infrared light modulated by said infrared command modulated logic level electrical signals.

13. System according to claim 12, wherein said amplifying and shaping means includes comparator means and said infrared light transducer means includes astable-multivibrator means.

* * * * *